United States Patent
Nakamura et al.

(10) Patent No.: US 12,298,510 B2
(45) Date of Patent: May 13, 2025

(54) HEAD-MOUNTED DISPLAY

(71) Applicant: Hitachi-LG Data Storage, Inc., Tokyo (JP)

(72) Inventors: Toshiteru Nakamura, Tokyo (JP); Takuma Kuno, Tokyo (JP); Ryuji Ukai, Tokyo (JP); Takahiro Mouri, Tokyo (JP); Masahito Uchiyama, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 540 days.

(21) Appl. No.: 17/766,277

(22) PCT Filed: Sep. 29, 2020

(86) PCT No.: PCT/JP2020/036786
§ 371 (c)(1),
(2) Date: Apr. 4, 2022

(87) PCT Pub. No.: WO2021/085007
PCT Pub. Date: May 6, 2021

(65) Prior Publication Data
US 2023/0144703 A1    May 11, 2023

(30) Foreign Application Priority Data
Oct. 29, 2019    (JP) ................. 2019-195793

(51) Int. Cl.
| | |
|---|---|
| *G02B 27/01* | (2006.01) |
| *F21V 8/00* | (2006.01) |
| *G02B 6/34* | (2006.01) |

(52) U.S. Cl.
CPC ....... *G02B 27/0172* (2013.01); *G02B 6/0031* (2013.01); *G02B 6/34* (2013.01); *G02B 2027/0174* (2013.01)

(58) Field of Classification Search
CPC .. G02B 27/01; G02B 27/017; G02B 27/0101; G02B 27/0172; G02B 27/02;
(Continued)

(56) References Cited

U.S. PATENT DOCUMENTS

| | | |
|---|---|---|
| 6,379,010 B1 | 4/2002 | Suzuki et al. |
| 7,570,859 B1 | 8/2009 | Dejong |

(Continued)

FOREIGN PATENT DOCUMENTS

| | | |
|---|---|---|
| CN | 111355939 | 6/2020 |
| JP | 11-133347 A | 5/1999 |

(Continued)

OTHER PUBLICATIONS

Chinese Office Action received in corresponding Chinese Application No. 202080068458.4 dated Dec. 28, 2023.
(Continued)

*Primary Examiner* — Sultan Chowdhury
(74) *Attorney, Agent, or Firm* — MATTINGLY & MALUR, PC

(57) ABSTRACT

A head-mounted display achieves both miniaturization and high efficiency of an optical system and expansion of an eye box. In order to achieve the above-described object, a head-mounted display that displays an image within a visual field of a user is provided. The head-mounted display includes: an image display unit that generates an image to be displayed; a projection unit that projects image light from the image display unit; an image rotation and replication unit that expands an eye box of projection light from the projection unit; and a waveguide unit that transmits image light from the image rotation and replication unit to a pupil of the user. The image rotation and replication unit includes an incidence surface, an emission surface, and at least two
(Continued)

reflection surfaces, and an angle formed by the incidence surface and the emission surface is greater than 90°.

14 Claims, 14 Drawing Sheets

(58) Field of Classification Search
CPC ...... G02B 17/00; G02B 17/002; G02B 17/04; G02B 17/06; G02B 17/08; G02B 6/0031; G02B 6/24; G02B 6/34; G02B 6/122; G02B 2027/0123; G02B 2027/0125; G02B 2027/0174; G02B 2027/0178
See application file for complete search history.

(56) References Cited

U.S. PATENT DOCUMENTS

| | | | |
|---|---|---|---|
| 11,181,815 B1* | 11/2021 | Wheelwright | G02B 27/0093 |
| 2002/0001397 A1 | 1/2002 | Ishikawa et al. | |
| 2003/0165017 A1 | 9/2003 | Amitai et al. | |
| 2006/0228073 A1 | 10/2006 | Mukawa et al. | |
| 2009/0015929 A1 | 1/2009 | Dejong et al. | |
| 2013/0242555 A1 | 9/2013 | Mukawa | |
| 2013/0250431 A1 | 9/2013 | Robbins et al. | |
| 2017/0186236 A1* | 6/2017 | Kawamoto | G06F 21/36 |
| 2018/0196505 A1 | 7/2018 | Nishizawa et al. | |
| 2019/0179149 A1* | 6/2019 | Curtis | G02B 5/22 |
| 2019/0212563 A1* | 7/2019 | Schultz | G02B 27/0081 |
| 2021/0048668 A1* | 2/2021 | Klug | G02B 27/0093 |
| 2021/0149183 A1 | 5/2021 | Murata et al. | |
| 2021/0165221 A1* | 6/2021 | Hasegawa | G02B 6/4204 |

FOREIGN PATENT DOCUMENTS

| | | |
|---|---|---|
| JP | 2000-227578 A | 8/2000 |
| JP | 2003-536102 A | 12/2003 |
| JP | 2010-533316 A | 10/2010 |
| JP | 2013-190658 A | 9/2013 |
| JP | 2015-121793 A | 7/2015 |
| JP | 2018-200415 A | 12/2018 |
| JP | 2019-521384 A | 7/2019 |
| WO | 2018/221026 | 12/2018 |
| WO | 2019/107044 A1 | 6/2019 |

OTHER PUBLICATIONS

Japanese Office Action received in corresponding Japanese Application No. 2019-195793 dated Sep. 12, 2023.
International Search Report of PCT/JP2020/036786 dated Dec. 22, 2020.

* cited by examiner

[FIG. 1]
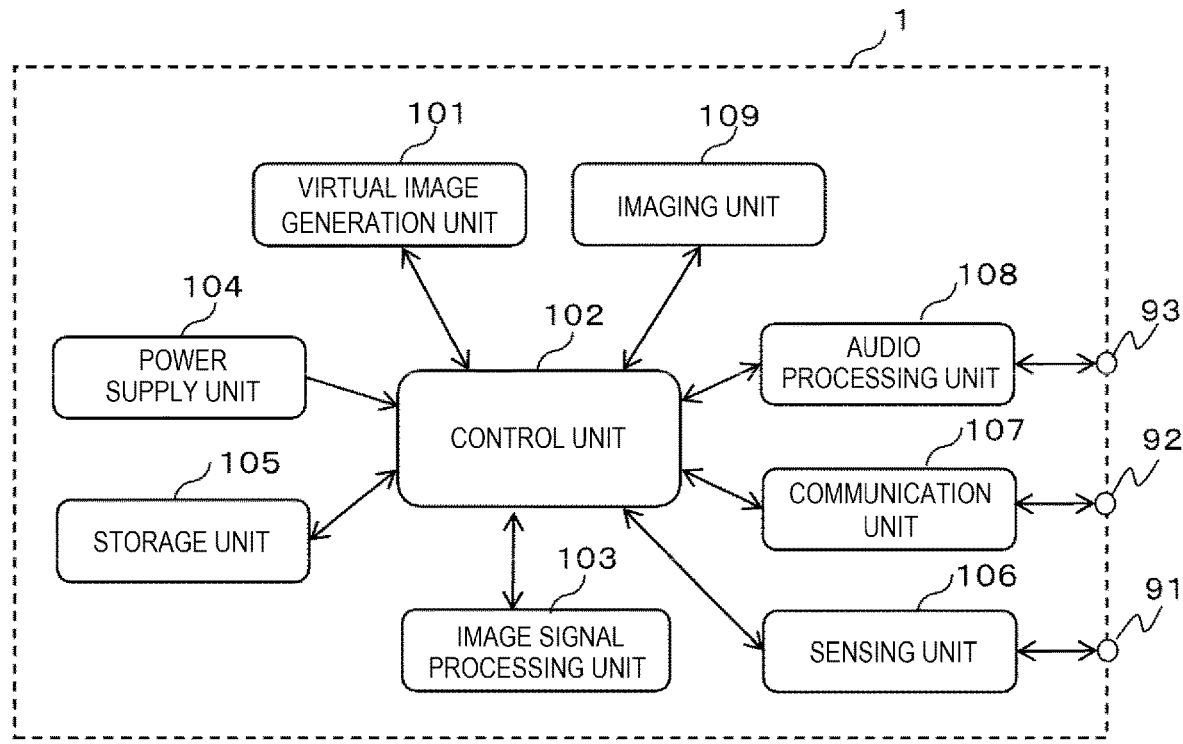
[FIG. 2]
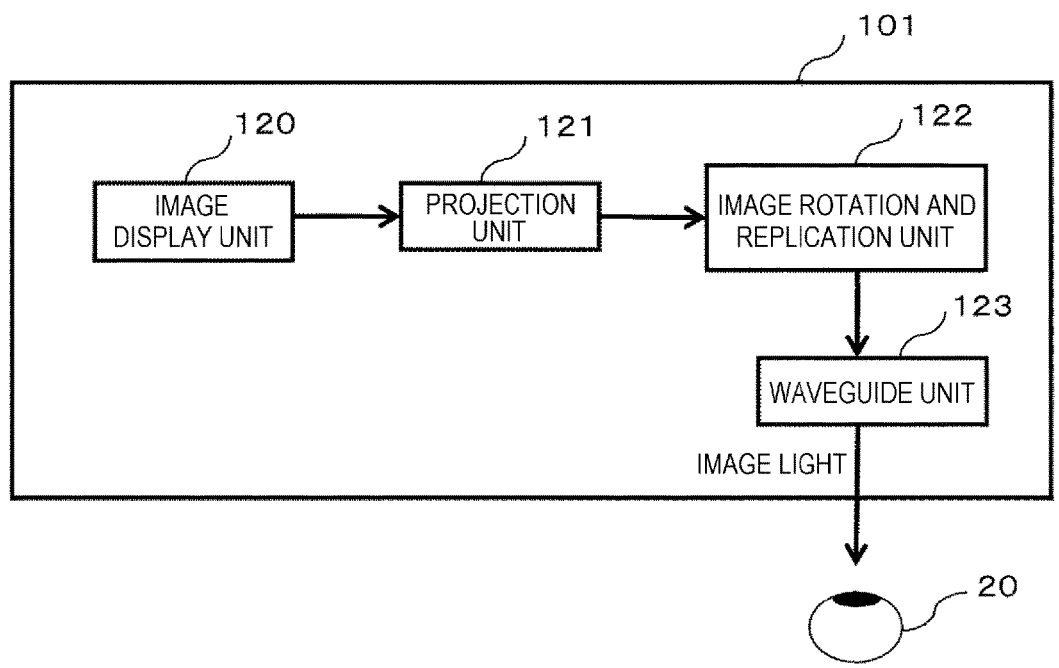

[FIG. 3]
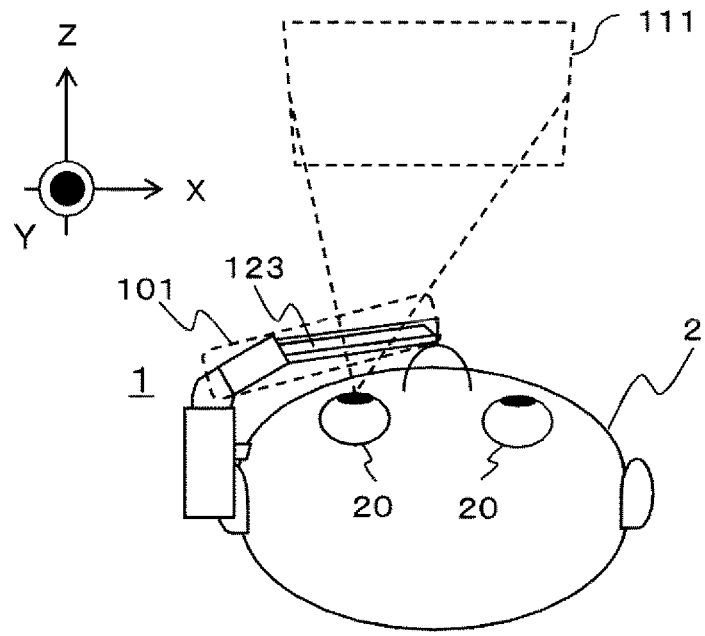
[FIG. 4]
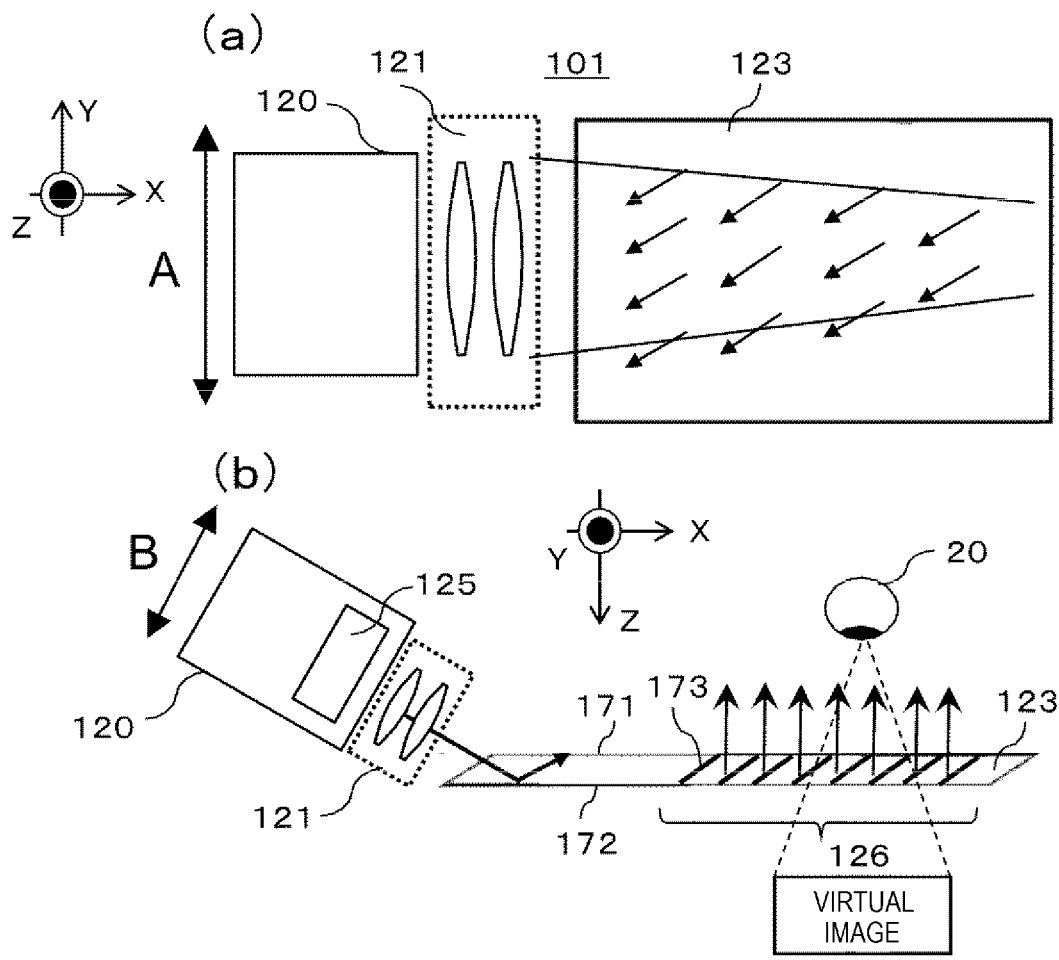

[FIG. 5]
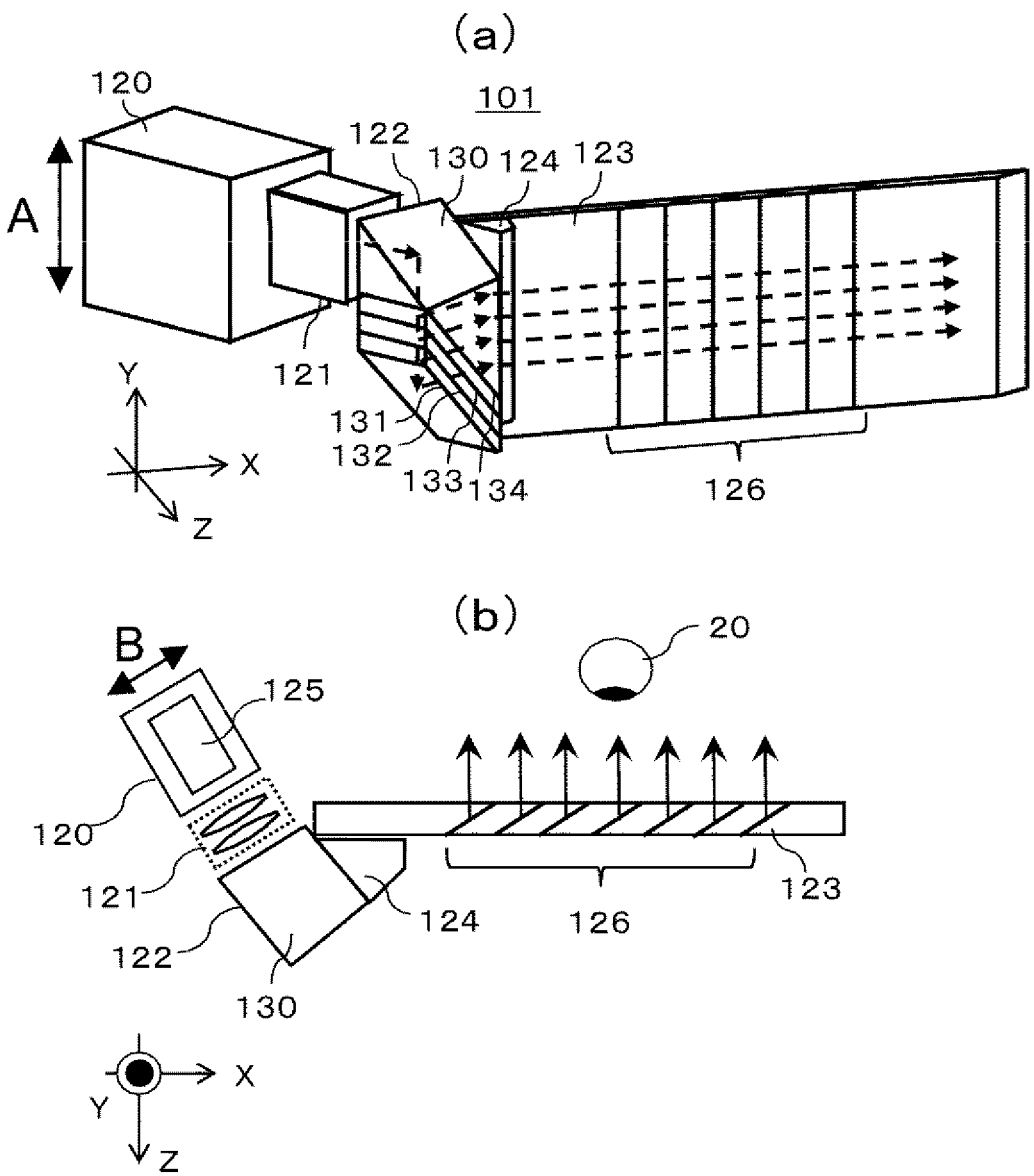

[FIG. 6]
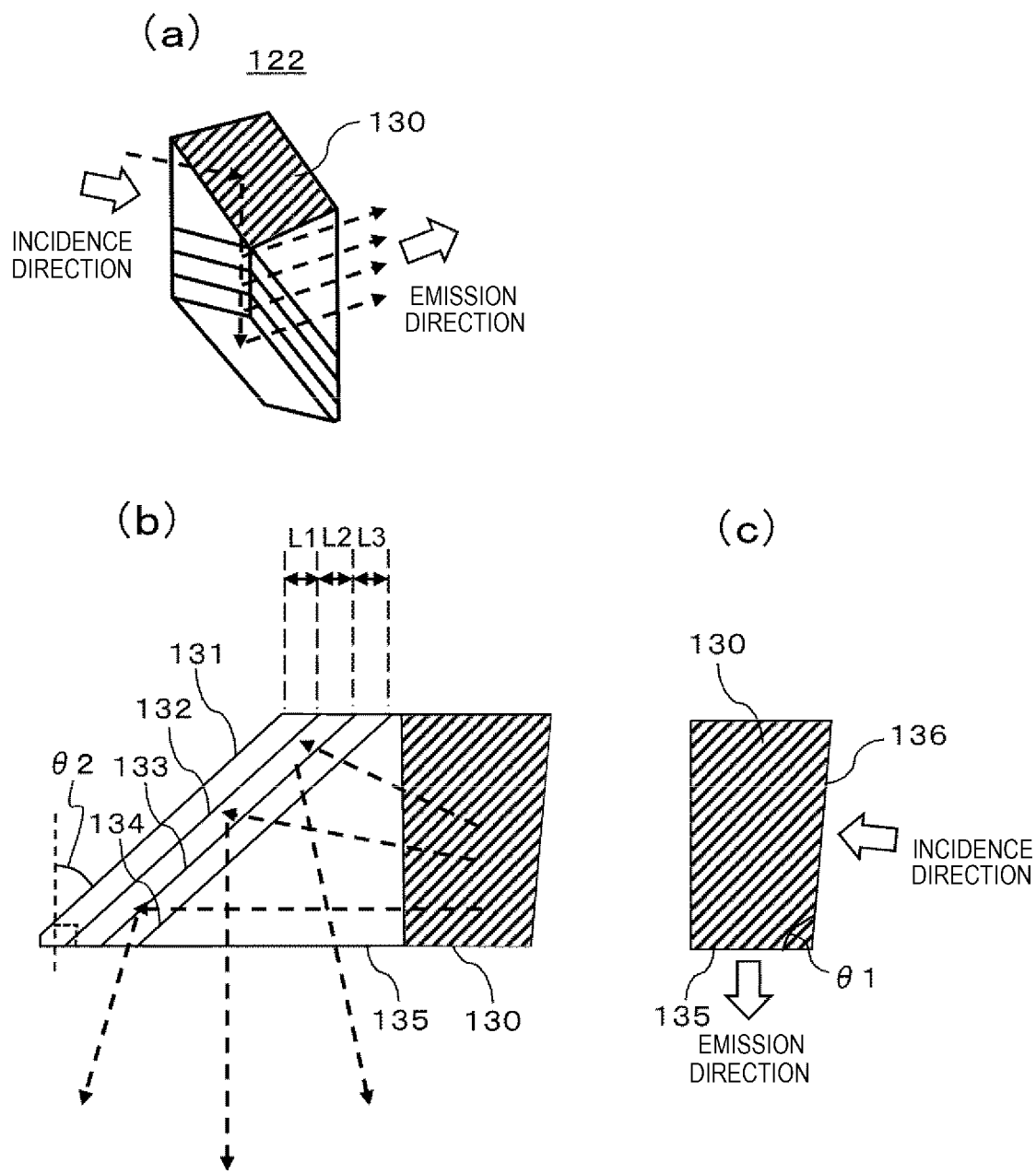

[FIG. 7]
(a)
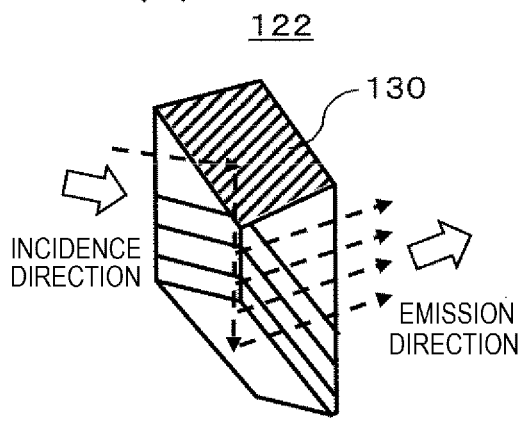
(b)
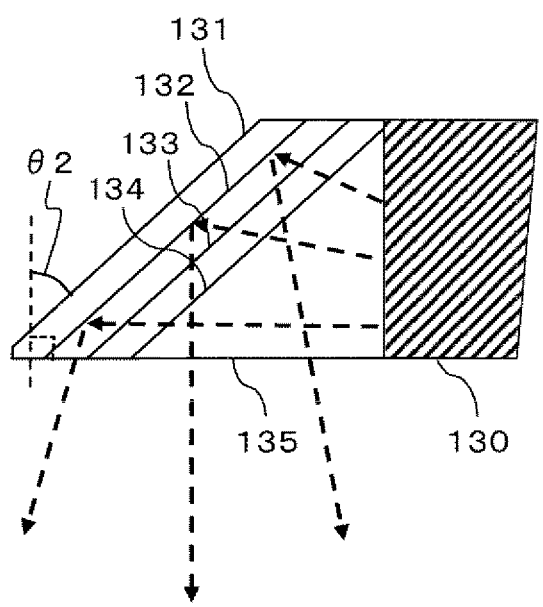
(c)
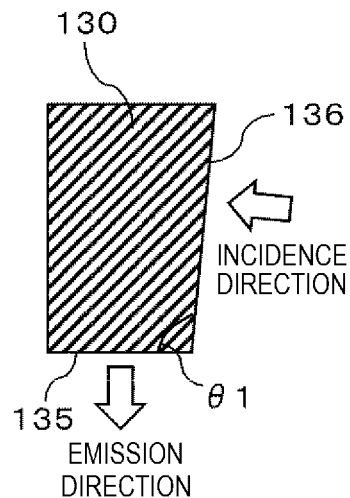

[FIG. 8]
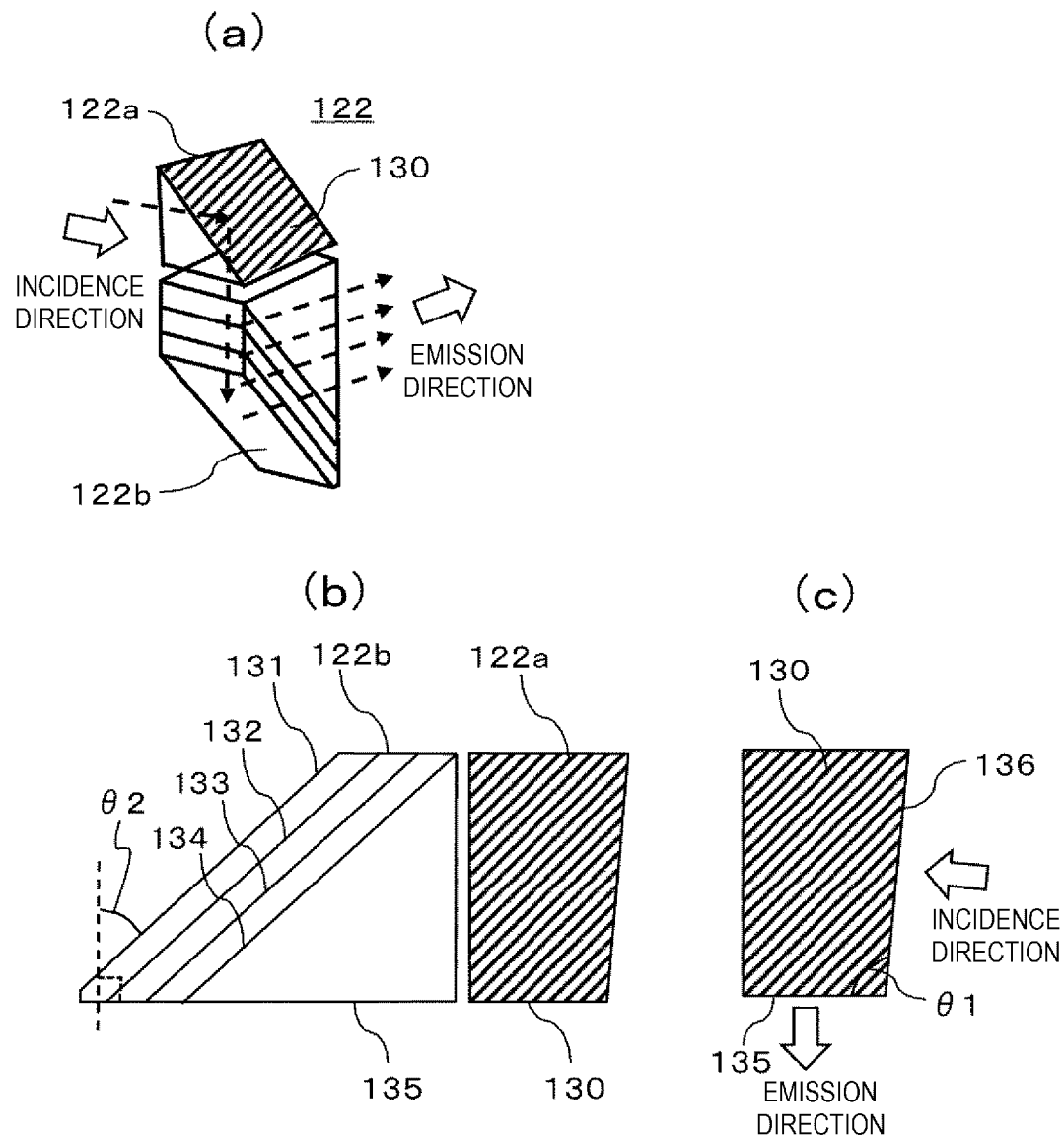

[FIG. 9]
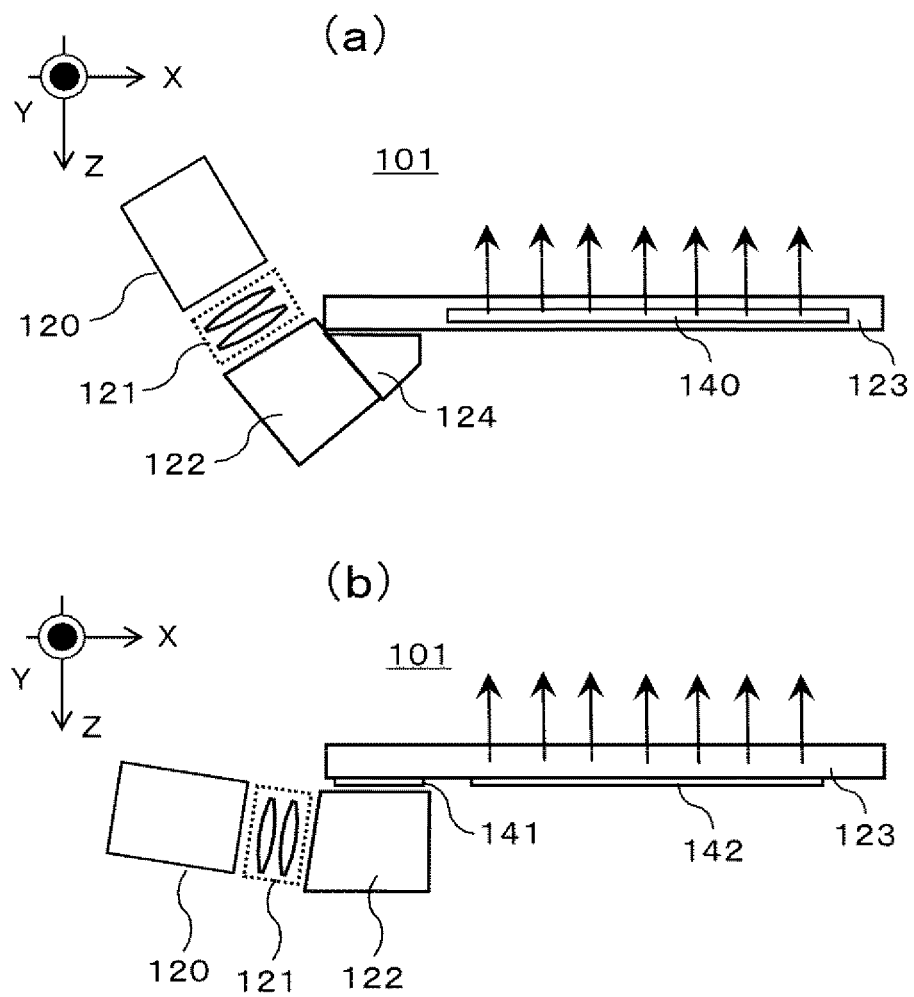

[FIG. 10]
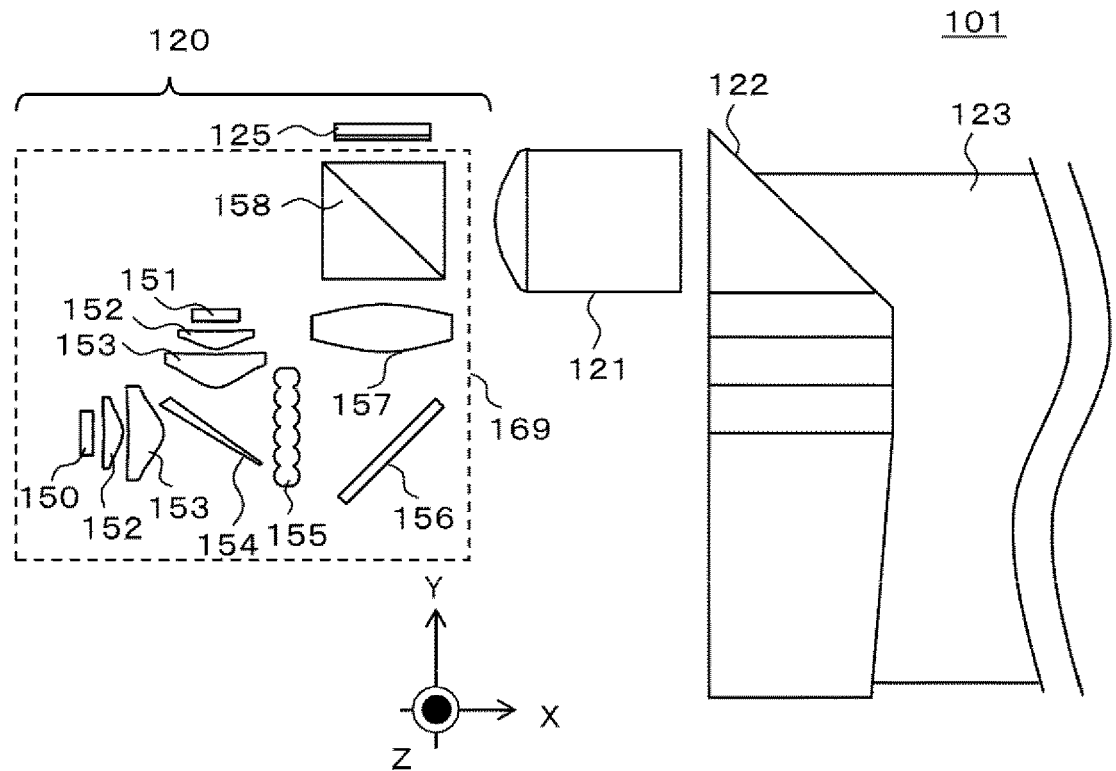
[FIG. 11]
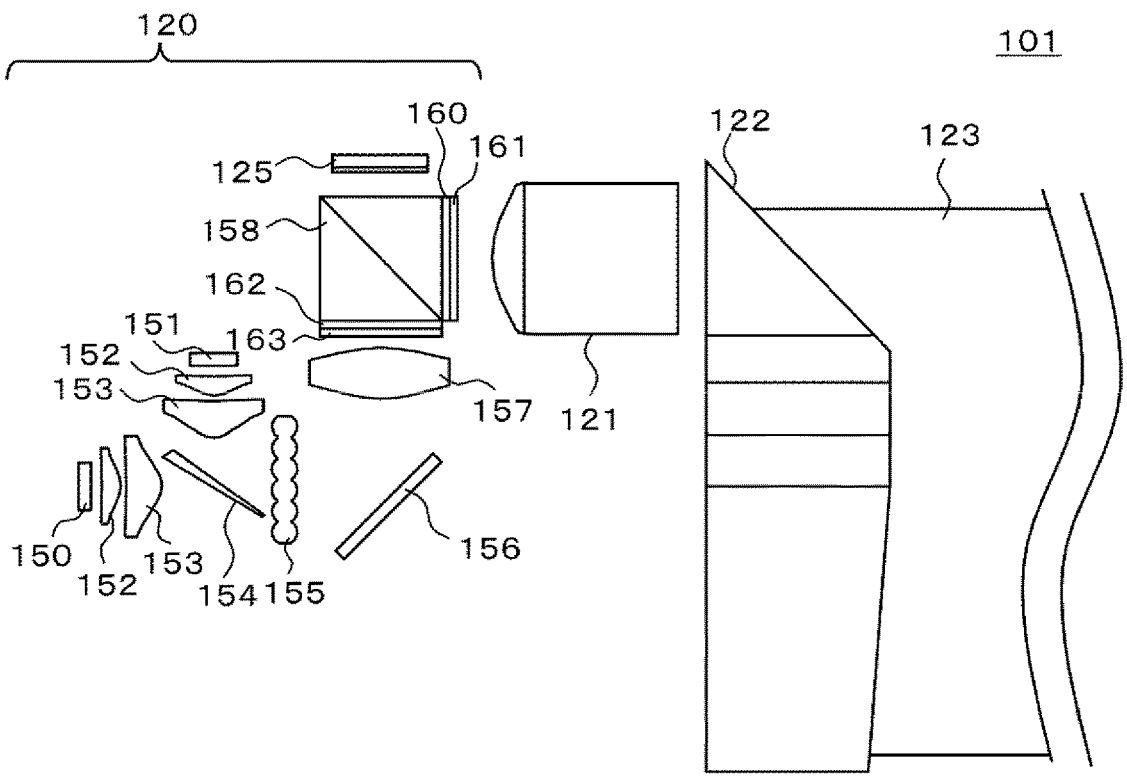

[FIG. 12]
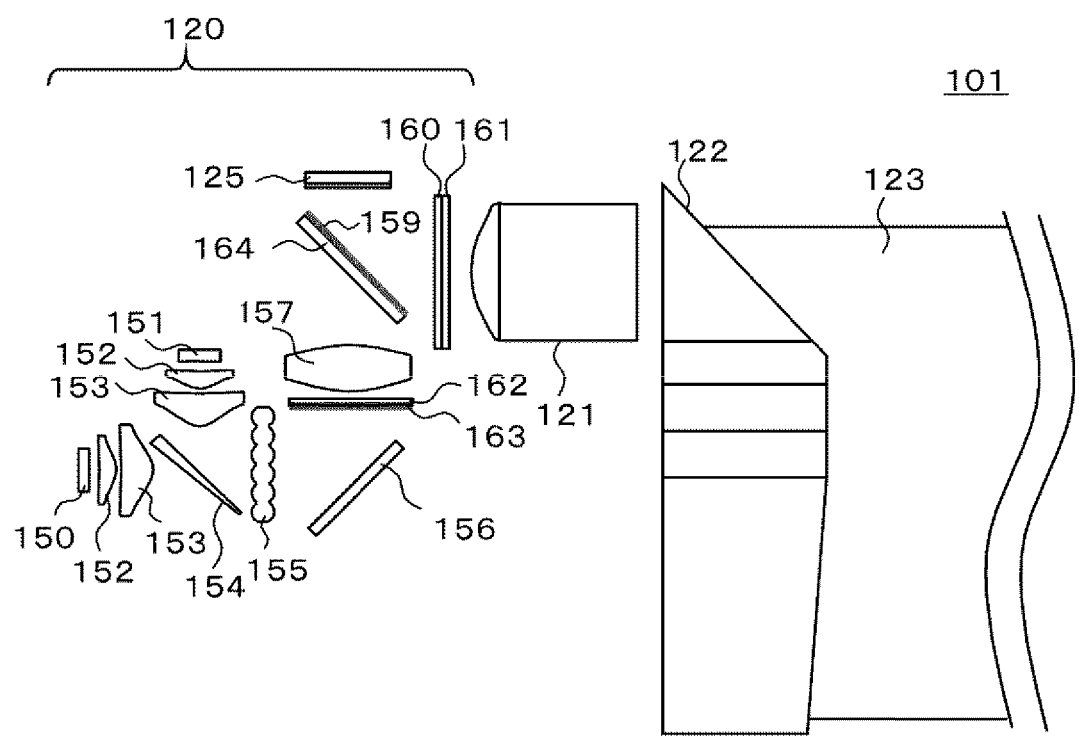

[FIG. 13]
(a)
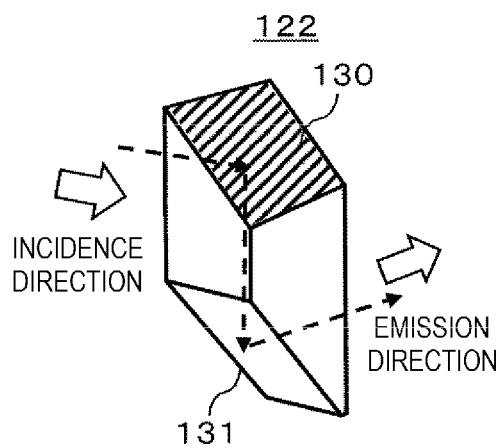
(b)
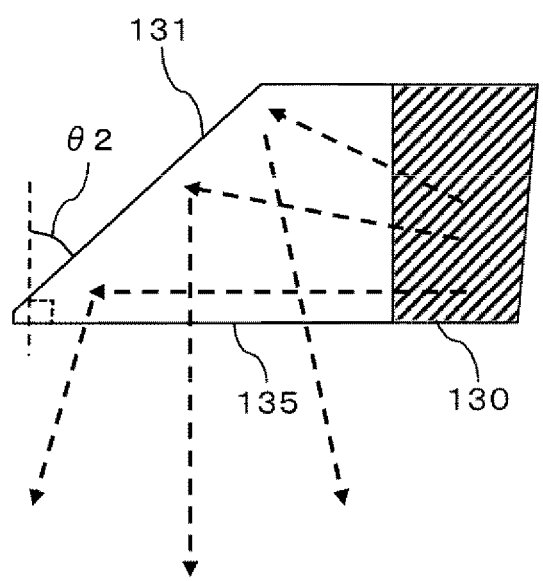
(c)
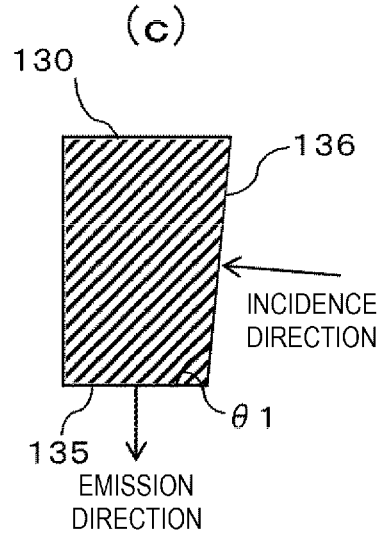

[FIG. 14]
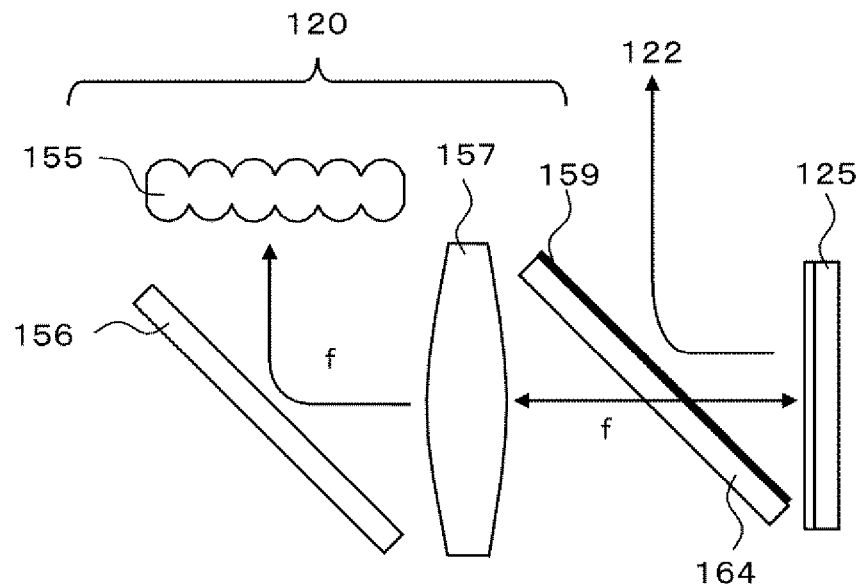
[FIG. 15]
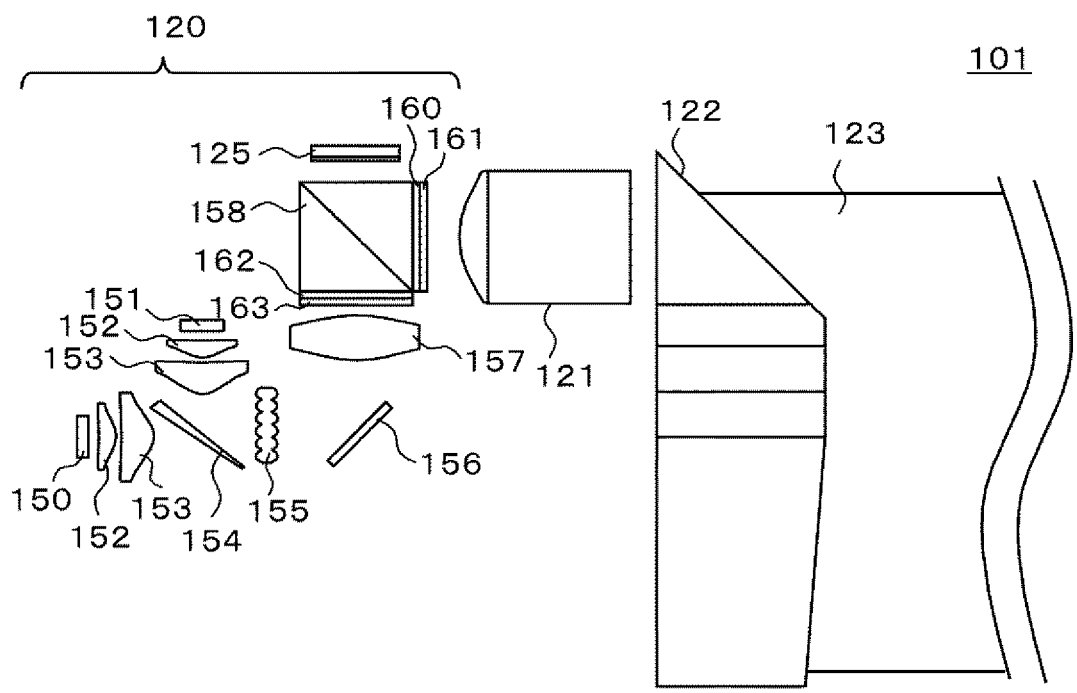

[FIG. 16]
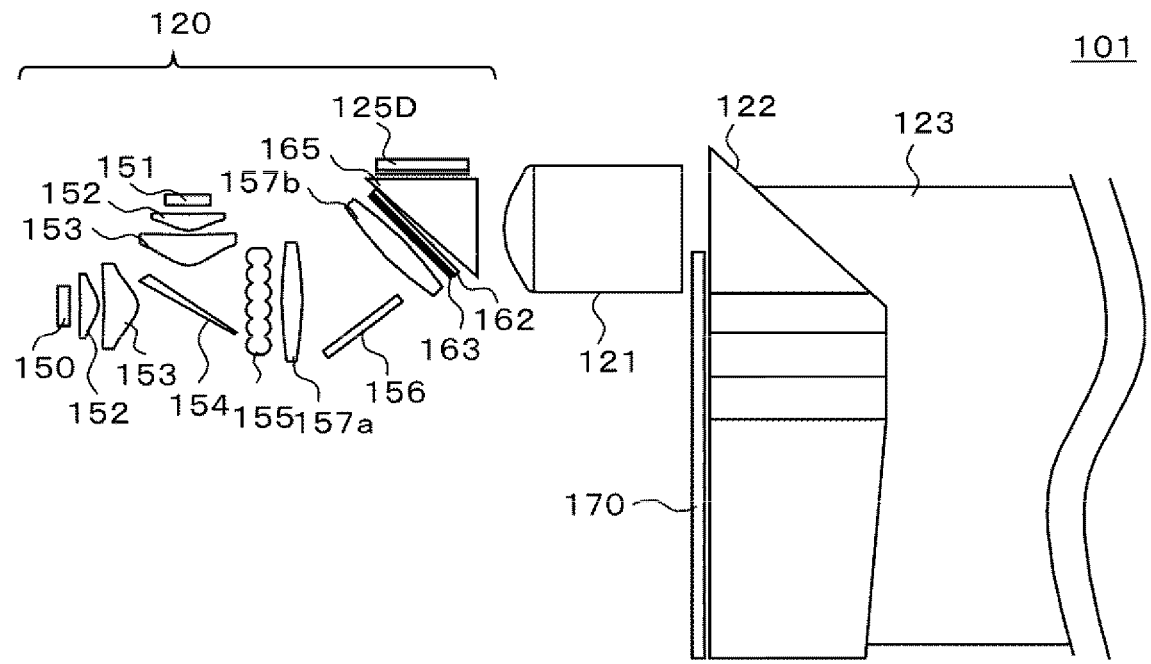
[FIG. 17]
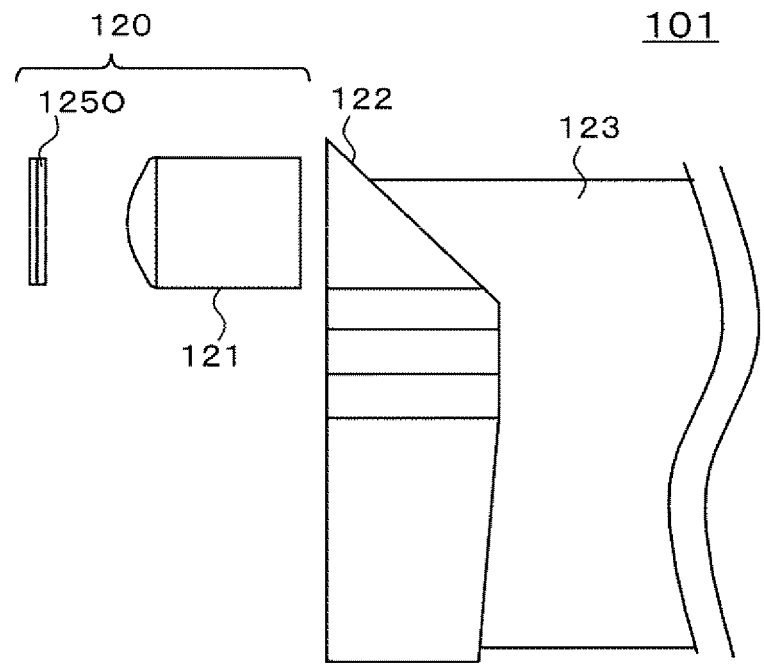

[FIG. 18]
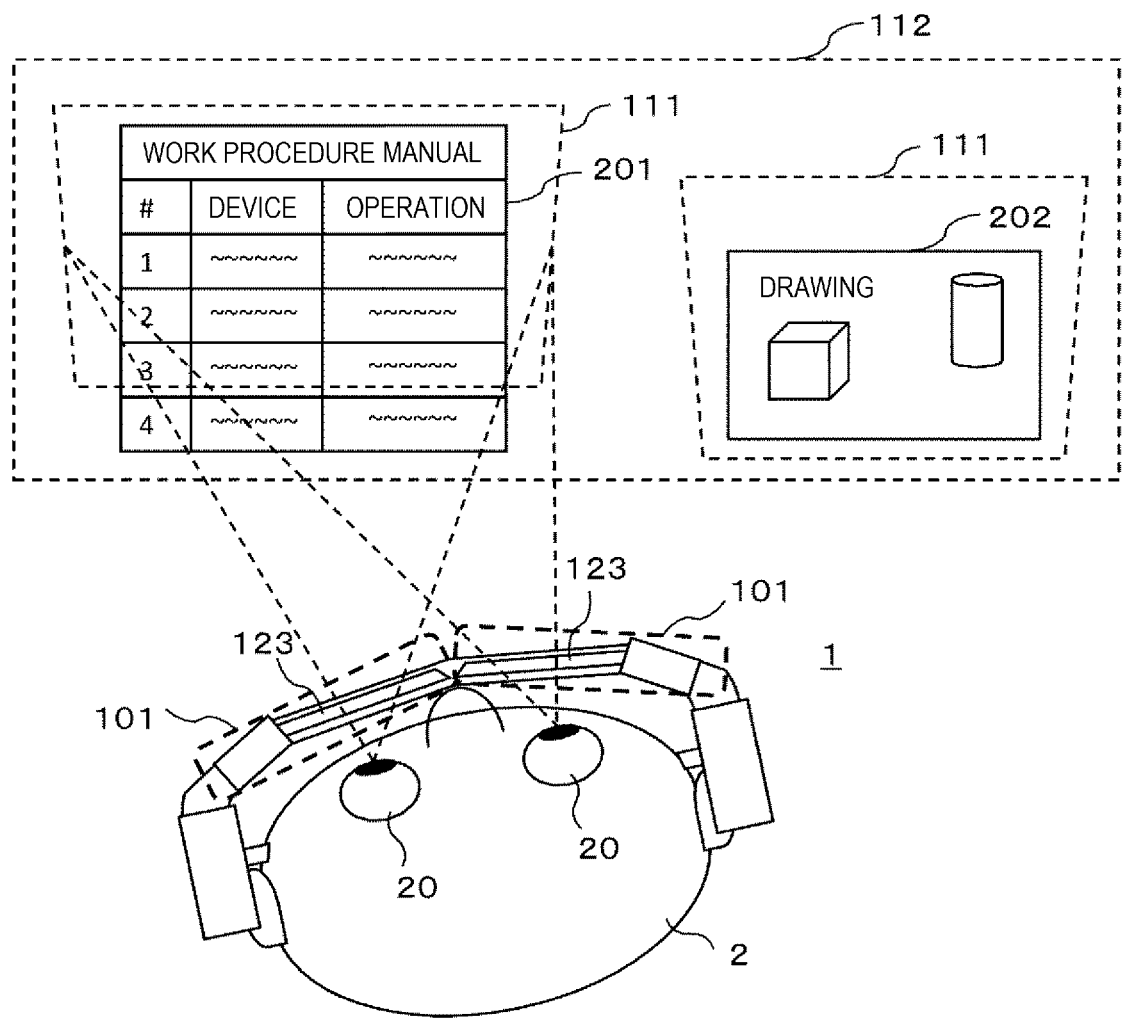

[FIG. 19]
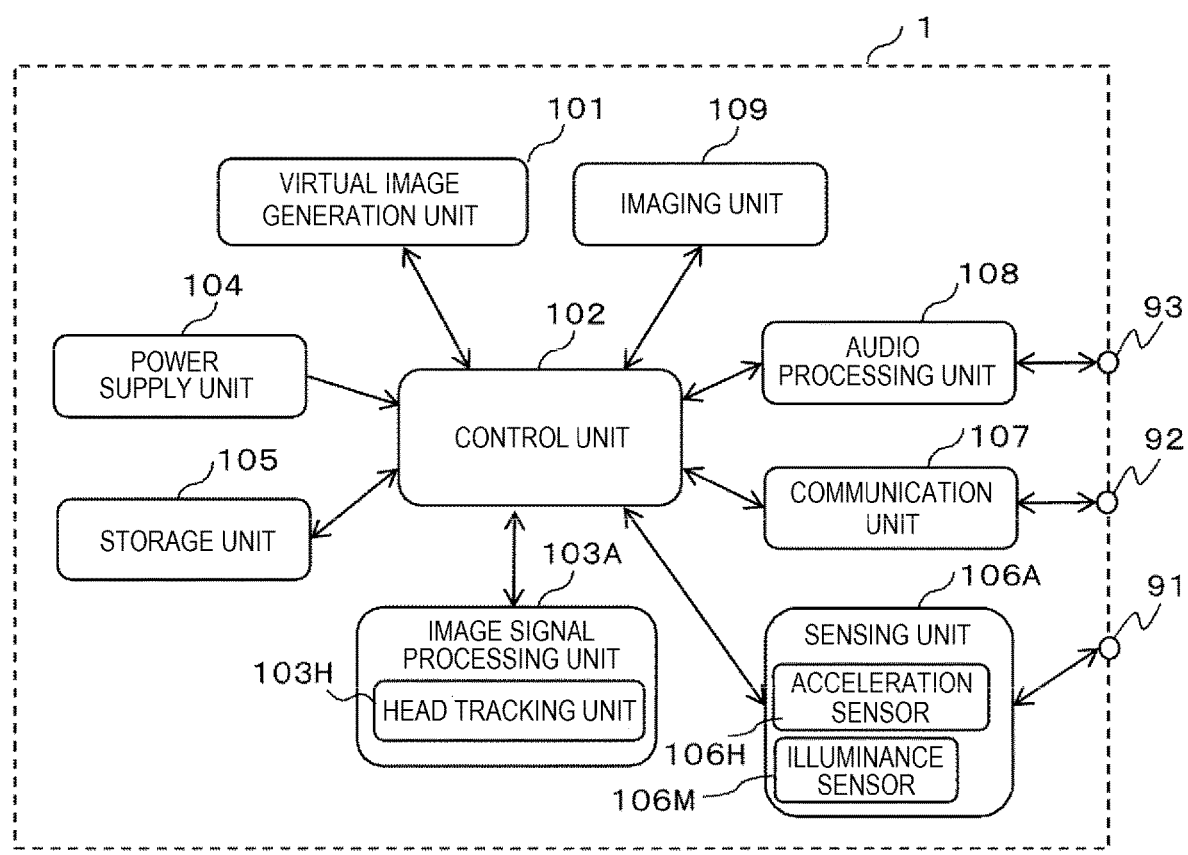

HEAD-MOUNTED DISPLAY

TECHNICAL FIELD

The present invention relates to a head-mounted display that is wearable on a head of a user and displays an image within a visual field.

BACKGROUND ART

A wearable device such as a head-mounted display (hereinafter, also abbreviated as an HMD) is required to have not only display performance such as ensuring a good visual field and image visibility, but also a structure that is compact and has excellent wearability.

As a related patent literature in this technical field, PTL 1 is provided. PTL 1 discloses an optical device including a flat substrate that transmits light, an optical unit that couples light into the substrate by total internal reflection, and a plurality of partially reflection surfaces included in the substrate, in which the partially reflection surfaces are parallel to each other and are not parallel to any edge of the substrate.

CITATION LIST

Patent Literature

PTL 1: JP-T-2003-536102

SUMMARY OF INVENTION

Technical Problem

An optical system of an HMD includes an image display unit including an illumination unit that transmits light emitted by a light source unit to a miniature display unit, and a projection unit that projects image light (virtual image) generated by the image display unit. When the HMD is displaced with respect to pupils of a user, part of a screen may be out of sight, and for this reason, an eye box is expanded by a pupil replication unit and a waveguide unit, and on the other hand, the expansion of the eye box causes problems such as an increase in the optical system size and a decrease in optical efficiency.

A miniature display disposed in the image display unit is generally an element having different screen aspect ratios in vertical and horizontal directions. When an image having a long aspect in the horizontal direction is displayed as a display screen, it is necessary to correspond to a screen long side direction of the image light from the miniature display in a horizontal plane direction of the projection unit. Due to this restriction, a width of a virtual image generation unit may be increased in a long side direction of the miniature display, and design of the HMD is deteriorated.

In PTL 1 described above, these problems are not taken into consideration in achieving both expansion of the eye box of the optical system and display of an image having a long side in the horizontal direction, and miniaturization and high efficiency of the HMD optical system.

An object of the invention is to provide an HMD that achieves both miniaturization and high efficiency of an optical system and expansion of an eye box.

Solution to Problem

An example of the invention is a head-mounted display that displays an image within a visual field of a user. The head-mounted display includes: an image display unit configured to generate an image to be displayed; a projection unit configured to project image light from the image display unit; an image rotation and replication unit configured to expand an eye box of projection light from the projection unit; and a waveguide unit configured to transmit image light from the image rotation and replication unit to a pupil of the user. The image rotation and replication unit includes an incidence surface, an emission surface, and at least two reflection surfaces, and an angle formed by the incidence surface and the emission surface is greater than 90°.

Advantageous Effect

According to the invention, it is possible to provide the HMD that achieves both miniaturization and high efficiency of an optical system and expansion of the eye box.

BRIEF DESCRIPTION OF DRAWINGS

FIG. 1 is a block diagram of an HMD according to a first embodiment.

FIG. 2 is a block diagram of a virtual image generation unit according to the first embodiment.

FIG. 3 is a diagram showing a mode of use of the HMD according to the first embodiment.

FIGS. 4(a) and 4(b) are configuration diagrams of a virtual image generation unit of the related art.

FIGS. 5(a) and 5(b) are configuration diagrams of the virtual image generation unit including an image rotation and replication unit according to the first embodiment.

FIGS. 6(a), 6(b) and 6(c) are configuration diagrams of the image rotation and replication unit according to the first embodiment.

FIGS. 7(a), 7(b) and 7(c) are configuration diagrams of an image rotation and replication unit according to a second embodiment.

FIGS. 8(a), 8(b) and 8(c) are configuration diagrams of an image rotation and replication unit according to a third embodiment.

FIGS. 9(a) and 9(b) are configuration diagrams of a virtual image generation unit including an image rotation and replication unit according to a fourth embodiment.

FIG. 10 is a configuration diagram of a virtual image generation unit according to a fifth embodiment.

FIG. 11 is a configuration diagram of a virtual image generation unit according to a sixth embodiment.

FIG. 12 is a configuration diagram of a virtual image generation unit according to a seventh embodiment.

FIGS. 13(a), 13(b) and 13(c) are configuration diagrams of an image rotation and replication unit according to the seventh embodiment.

FIG. 14 is a diagram showing an outline of a telecentric optical system according to an eighth embodiment.

FIG. 15 is a configuration diagram of a virtual image generation unit according to a ninth embodiment.

FIG. 16 is a configuration diagram of a virtual image generation unit according to a tenth embodiment.

FIG. 17 is a configuration diagram of a virtual image generation unit according to an eleventh embodiment.

FIG. 18 is a diagram showing an example of use of an HMD according to a twelfth embodiment.

FIG. 19 is a block diagram of the HMD according to the twelfth embodiment.

DESCRIPTION OF EMBODIMENTS

Hereinafter, embodiments of the invention will be described with reference to the drawings.

First Embodiment

FIG. 1 is a block diagram of an HMD according to a first embodiment. In FIG. 1, an HMD 1 includes a virtual image generation unit 101, a control unit 102, an image signal processing unit 103, a power supply unit 104, a storage unit 105, a sensing unit 106, a communication unit 107, an audio processing unit 108, an imaging unit 109, and input-output units 91 to 93.

The virtual image generation unit 101 enlarges and projects an image displayed on a miniature display unit (micro display) as a virtual image, and displays an image of augmented reality (AR) or mixed reality (MR) within a visual field of a wearer (user).

The control unit 102 integrally controls the entire HMD 1. A function of the control unit 102 is implemented by an arithmetic device such as a central processing unit (CPU). The image signal processing unit 103 supplies an image signal for display to a display unit in the virtual image generation unit 101. The power supply unit 104 supplies power to each unit of the HMD 1.

The storage unit 105 stores information necessary for processing of each unit of the HMD 1 and information generated by each unit of the HMD 1. The storage unit 105 stores programs and data executed by the CPU when the function of the control unit 102 is implemented by the CPU. The storage unit 105 includes, for example, a storage device such as a random access memory (RAM), a flash memory, a hard disk drive (HDD), or a solid state drive (SSD).

The sensing unit 106 is connected to various sensors via the input-output unit 91 which is a connector, and detects a posture (that is, a posture of the user, head orientation of the user), movement, an ambient temperature, and the like of the HMD 1 based on signals detected by the various sensors. For example, an inclination sensor, an acceleration sensor, a temperature sensor, a sensor of a global positioning system (GPS) that detects user position information, and the like are connected as the various sensors.

The communication unit 107 communicates with an external information processing device by short-range wireless communication, long-range wireless communication, or wired communication via the input-output unit 92 which is a connector. Specifically, the communication is performed by Bluetooth (registered trademark), Wi-Fi (registered trademark), a mobile communication network, a universal serial bus (USB, registered trademark), a high-definition multimedia interface (HDMI (registered trademark)), or the like.

The audio processing unit 108 is connected to an audio input-output device such as a microphone, an earphone, or a speaker via the input-output unit 93 which is a connector, and inputs or outputs an audio signal. The imaging unit 109 is, for example, a miniature camera or a miniature time of flight (TOF) sensor, and captures an image within a visual field direction of the user of the HMD 1.

FIG. 2 is a block diagram of the virtual image generation unit 101 according to the present embodiment. The virtual image generation unit 101 includes an image display unit 120, a projection unit 121, an image rotation and replication unit 122, and a waveguide unit 123. The image display unit 120 is a processing unit that generates an image to be displayed, and irradiates a built-in miniature display unit (not shown) with light from a light source such as an LED or a laser. The miniature display unit is an element that displays an image, and uses a liquid crystal display, a digital micromirror device, an organic EL display, micro electro mechanical systems (MEMS), or the like. The projection unit 121 enlarges image light of the image display unit 120 and projects the enlarged image light as a virtual image. The image rotation and replication unit 122 performs image rotation and pupil replication for expanding an eye box. The waveguide unit 123 transmits image light from the projection unit 121 and the image rotation and replication unit 122 to a pupil 20 of a user. The image light is formed on the pupil 20, and the user can visually recognize an image.

FIG. 3 is a diagram showing a mode of use of the HMD 1 according to the present embodiment. FIG. 3 shows a state viewed down from above a head of a user 2, and an X axis is a horizontal direction, a Y axis is a vertical direction, and a Z axis is a visual axis direction which is a visual line direction of the user 2. In the following drawings, the directions of the X, Y, and Z axes are similarly defined.

The HMD 1 is mounted on the head of the user 2, and transmits an image generated by the virtual image generation unit 101 to the pupil 20 of the user via the waveguide unit 123. At this time, the user 2 can visually recognize the image (virtual image) in a state (see-through type) in which the outside world can be visually recognized in a part of an image display area 111 within a visual field. FIG. 3 shows a configuration in which an image is displayed on one eye, and a configuration in which the image is displayed in both eyes may be used. The HMD 1 can also capture an image of a visual field range of the user 2 in the imaging unit 109 of FIG. 1.

Next, FIG. 4 shows a configuration diagram of the virtual image generation unit 101 using the waveguide unit 123 of a mirror array type of the related art. In FIG. 4, (a) shows the virtual image generation unit 101 viewed from the Z axis direction, which is the visual axis direction, and (b) shows the virtual image generation unit 101 viewed from the Y axis direction, which is the vertical direction. The waveguide unit 123 is in a flat plate shape having two main parallel planes 171 and 172, and includes at least two beam splitter mirror arrays 173, which are partially reflection surfaces inside, in order to expand the eye box. A mirror array unit 126 having a reflecting film that reflects a part of the image light has a function of replicating an exit pupil of the projection unit 121 in the X axis direction. Preferably, the beam splitter mirror arrays 173 are substantially parallel to each other so that an angular deviation does not occur in reflected signal light.

The eye box formed by the virtual image generation unit 101 is preferably expanded in a two-dimensional direction from the viewpoint of image visibility. Since the waveguide unit 123 expands the eye box only in the horizontal direction, an optical engine needs to input image light having a large light beam diameter in the vertical direction. Therefore, it is necessary to reduce an F value of an optical system of the image display unit 120 in the vertical direction, and portions of the image display unit 120 and the projection unit 121 having a dimension A in (a) of FIG. 4 are greater and the virtual image generation unit 101 is greater. Due to the characteristics of an HMD as a device that is wearable for use, a weight and appearance design are also important factors in use, and are important points for increasing the commercial value.

In addition, there is a problem in a case of coping with a user wearing vision correction glasses. That is, in the configuration of the related art of FIG. 4, since the projection unit 121 and the image display unit 120 are closer to a pupil side than the waveguide unit 123 as shown in (b) of FIG. 4, it is necessary to move the projection unit 121 and the image display unit 120 to the outside of a side surface of the face of the user in order to prevent a corner portion connecting the front of the vision correction glasses and a hinge from interfering with the projection unit 121 and the image display unit 120. Therefore, it is necessary to lengthen the horizontal direction of the waveguide unit 123 in order to provide an image emitted from the waveguide unit 123 to the pupil 20 of the user. The eye box is reduced when a distance from the projection unit to the pupil of the user increases. Therefore, it is necessary to expand the eye box in the vertical direction according to the reduction, and the dimension A of the image display unit 120 and the projection unit 121 is further increased.

As shown in (b) of FIG. 4, a miniature display unit 125 disposed in the image display unit 120 is generally an element having different screen aspect ratios in vertical and horizontal directions. When an image having a long aspect in the horizontal direction is displayed as a screen to be displayed from the waveguide unit 123, it is necessary to correspond to a screen long side direction of the image light incident from the miniature display on the projection unit in a horizontal plane (XZ plane) direction of the projection unit 121. Due to this restriction, a portion having a dimension B is increased in a long side direction of the miniature display, the size of the image display unit 120 is increased and the design of the HMD is impaired.

As described above, in the HMD, there is a problem in achieving both miniaturization and high luminance for expansion of the eye box and display of an aspect image having a long side in the horizontal direction. Hereinafter, solutions thereof are described.

FIG. 5 is a configuration diagram of the virtual image generation unit according to the present embodiment. In FIG. 5, the components same as those in FIG. 4 are denoted by the same reference numerals, and the description thereof is omitted. In FIG. 5, (a) and (b) respectively show a case where the virtual image generation unit 101 is viewed from the Z axis direction and a case where the virtual image generation unit 101 is viewed from the Y axis direction, as in FIG. 4. In the present embodiment, the above-described problem is solved by the image rotation and replication unit 122.

As described above, the eye box formed by the virtual image generation unit 101 is preferably expanded in the two-dimensional direction from the viewpoint of image visibility. In order to two-dimensionally expand the eye box, the eye box is expanded in the vertical direction by the image rotation and replication unit 122. The image rotation and replication unit 122 includes an emission reflective surface group including at least two emission reflective surfaces that are partially reflection surfaces that reflect image light toward the waveguide unit 123. As shown in (a) of FIG. 5, the present embodiment shows an example in which emission reflective surfaces 131 to 134 are provided as the emission reflective surface group. Preferably, the emission reflective surface groups 131 to 134 are substantially parallel to each other. FIG. 5 shows a configuration in which the number of emission reflective surfaces is four, but the number of emission reflective surfaces is not necessarily limited thereto. With this configuration, a beam diameter of the image light from the projection unit 121 can be reduced.

Therefore, the F value of the optical system can be increased, and sizes of portions of the image display unit 120 and the projection unit 121 corresponding to the dimension A can be reduced.

Further, in order to reduce the size of the portion having the dimension B, the miniature display unit 125 is rotated by 90° with respect to the projection unit 121 as shown in (b) of FIG. 5. In this case, in the horizontal plane (XZ plane) of the projection unit 121, a screen short side direction of the image light corresponds to a direction of the light incident from the miniature display unit 125 to the projection unit 121, so that the dimension B of the image display unit 120 and the projection unit 121 can be reduced, the size of the virtual image generation unit 101 can be reduced, and the design of the virtual image generation unit 101 can be improved. However, in this case, a problem occurs that a visible image becomes a screen having a long aspect in the vertical direction. Therefore, by providing an incidence reflective surface 130 that reflects the image light from the projection unit 121 to the inside in the image rotation and replication unit 122, and setting predetermined twist angles between a normal line of the incidence reflective surface 130 and normal lines of the emission reflective surface groups 131 to 134, a screen visually recognized from the waveguide unit 123 can be rotated by a predetermined angle. For example, when the miniature display unit 125 is rotated by 90°, the predetermined twist angle between the normal line of the incidence reflective surface and the normal line of the emission reflective surface group is 90°. The image light emitted from the image rotation and replication unit 122 is incident on the waveguide unit 123 via a coupling unit 124 so as to be propagated to the waveguide unit by total reflection.

As described above, by adopting a configuration using the image rotation and replication unit 122, it is possible to provide the virtual image generation unit 101 that is compact and has good design while two-dimensionally expanding the eye box. A direction of the pupil replication of the waveguide unit and the image rotation and replication unit is not necessarily the directions shown in (b) of FIG. 5, and may be any direction as long as the eye box is expanded two-dimensionally.

As a further advantage of the configuration of the present embodiment, there is an effect that the size of the device can be reduced in order to make the HMD wearable even by a user wearing vision correction glasses. That is, as shown in (b) of FIG. 5, the image light can be incident on the waveguide unit 123 from a side opposite to a side where the pupil 20 of the user is located via the coupling unit 124. Accordingly, the image rotation and replication unit 122, the projection unit 121, and the image display unit 120 can be disposed on the side opposite to the side where the pupil is located with respect to the waveguide unit 123 as compared with the related art. Therefore, in response to the problem in the case of coping with a user wearing vision correction glasses having the configuration of the related art, a horizontal dimension of the waveguide unit 123 can be made shorter than that of the configuration of the related art without interfering with the vision correction glasses of the user. Accordingly, it is possible to reduce an expansion amount of the eye box, and thus it is possible to reduce manufacturing costs by reducing the size of the image rotation and replication unit (particularly, in the vertical direction) and reducing the size of the emission reflective surface.

As described above, by making an emission direction of the image light from a projection lens different from an incidence direction of the image light to the waveguide unit and making it possible to input the image light from the outside of the waveguide unit by using the image rotation and replication unit 122, it is possible to achieve a configuration capable of coping with a user wearing vision correction glasses, achieving reduction in size, and achieving reduction in manufacturing costs.

A specific configuration of the image rotation and replication unit 122 in the present embodiment will be described with reference to FIG. 6. In FIG. 6, (a) is an external view of the image rotation and replication unit 122, (b) is a schematic view of the image rotation and replication unit 122 as viewed from a direction parallel to the emission reflective surfaces 131 to 134 and an emission surface 135, and (c) is an external view of the image rotation and replication unit 122 as viewed from a direction parallel to the emission surface 135 and an incidence surface 136. For explanation, the incidence reflective surface 130 is hatched.

When the image light incident from the projection unit 121 and reflected by the incidence reflective surface 130 is incident on the emission surface 135 of the image rotation and replication unit 122 before being reflected by the emission reflective surfaces 131 to 134, stray light is generated due to internal total reflection. Due to a geometric configuration, in particular, the emission surface 135 side has a distance from the incidence reflective surface 130 to the emission reflective surface, and thus stray light due to internal reflection is easily generated on the emission surface 135 side.

Therefore, in order to prevent a component of image light having a predetermined angle of view range from being reflected by the incidence reflective surface 130 toward the emission surface 135 side as shown by a dotted line in (b) of FIG. 6 and to achieve a geometric configuration that does not affect screen rotation, it is necessary that an angle θ1 formed by the incidence surface 136 and the emission surface 135 is 90° or more as shown in (c) of FIG. 6, and an angle θ2 formed by the emission reflective surfaces 131 to 134 and a normal line of the emission surface 135 is 45° or more as shown in (b) of FIG. 6. The angles θ1 and θ2 satisfy θ×2=θ1, so that an image light propagation angle in the image rotation and replication unit 122 can be adjusted to prevent the generation of stray light inside without affecting the rotation of an image from the waveguide unit 123, offset of the angle of view, and the like.

From the viewpoint of preventing luminance unevenness of a screen, spacings L1 to L3 between the respective reflection surfaces of the emission reflective surfaces 131 to 134 are preferably less than an outer diameter of a projection lens constituting the projection unit 121. Accordingly, the image light is reproduced seamlessly, and luminance unevenness can be prevented. Further, by making the spacings L1 to L3 less than a diameter of the exit pupil formed by the projection unit 121, the reproduced image light has no seams, and the luminance unevenness can be prevented.

As described above, according to the present embodiment, it is possible to provide the HMD that achieves both miniaturization and high efficiency of an optical system and expansion of an eye box.

Second Embodiment

FIG. 7 is a configuration diagram of an image rotation and replication unit according to a second embodiment. In FIG. 7, the components same as those in FIG. 6 are denoted by the same reference numerals, and the description thereof is omitted. FIG. 7 is different from FIG. 6 in that the incidence reflective surface 130 and a part of the emission reflective surface 134 closest to the incidence reflective surface 130 intersect with each other. When avoiding stray light due to internal reflection, the image light is a path as shown by a dotted line as described above, so that the distances between the incidence reflective surface 130 and the emission reflective surfaces 131 to 134 of the image rotation and replication unit 122 can be reduced and the size can be reduced without affecting the substantial image quality even if the incidence reflective surface 130 and a part of the emission reflective surface 134 intersect with each other.

Therefore, according to the present embodiment, it is possible to provide the HMD that achieves both miniaturization and high efficiency of an optical system and expansion of an eye box.

Third Embodiment

FIG. 8 is a configuration diagram of an image rotation and replication unit according to a third embodiment. In FIG. 8, the components same as those in FIG. 6 are denoted by the same reference numerals, and the description thereof is omitted. FIG. 8 is different from FIG. 6 in that the incidence reflective surface 130 and the emission reflective surfaces 131 to 134 are not integrated and are separated into a first prism 122a having the incidence reflective surface 130 and a second prism 122b having the emission reflective surfaces 131 to 134. As shown in FIG. 6, in the manufacture of a prism in which the incidence reflective surface 130 and the emission reflective surfaces 131 to 134 are integrated, steps of joining and cutting a plurality of reflection surfaces are complicated, and manufacturing costs are increased. In contrast, as in the present embodiment, the incidence reflective surface 130 and the emission reflective surfaces 131 to 134 are separated from each other, and the first and second prisms having a shape close to a simple triangular prism are manufactured, respectively, so that the costs can be reduced.

Therefore, according to the present embodiment, it is possible to achieve both miniaturization and high efficiency of an optical system and expansion of an eye box, and to provide the HMD with lower costs.

Fourth Embodiment

FIG. 9 is a configuration diagram of a virtual image generation unit according to a fourth embodiment. In FIG. 9, the components same as those in FIG. 5 are denoted by the same reference numerals, and the description thereof is omitted. FIG. 9 is different from FIG. 5 in the configuration of the waveguide unit 123.

In FIG. 9, the waveguide unit 123 in the present embodiment has a waveguide unit configuration using a diffraction grating, a volume hologram, a beam splitter array (BSA), or the like, and thus can be an HMD having see-through properties.

In (a) of FIG. 9, a volume hologram is used for the waveguide unit 123. That is, this is an example of a case where image light propagating in the waveguide unit is diffracted by a volume hologram 140 instead of a mirror array as a unit that outputs the image light to the pupil 20 of a user. In (b) of FIG. 9, the waveguide unit 123 uses a surface digging-type diffraction grating. This is an example of a case where a surface digging-type diffraction grating 141 is provided as a unit that inputs image light to the waveguide unit and a surface digging-type diffraction grating 142 is used as a unit that propagates the captured light in a parallel plate by total reflection and outputs the image light to the pupil 20 of a user.

Therefore, according to the present embodiment, it is possible to provide the HMD having the effect of the first embodiment and the see-through properties.

Fifth Embodiment

FIG. 10 is a configuration diagram of a virtual image generation unit according to a fifth embodiment. In FIG. 10, the components same as those in FIG. 5 are denoted by the same reference numerals, and the description thereof is omitted. FIG. 10 is different from FIG. 5 in that the specific configuration of the image display unit 120 is described.

In FIG. 10, the image display unit 120 includes the miniature display unit 125 and an illumination optical system 169 that transmits light emitted by a light source unit to the miniature display unit 125.

The illumination optical system 169 includes a light source unit 150 of green (G) and a light source unit 151 of red (R) and blue (B) as light source units. The light from each light source is substantially collimated by condenser lenses 152 and 153. The substantially collimated light from the light sources of respective colors is combined by a color combining unit 154.

Here, an example in which a wedge-shaped dichroic mirror is used as the color combining unit 154 is shown. The dichroic mirror combines substantially collimated light of an R light, a B light, and a G light and emits the combined light. At this time, optical axes of the respective colors do not necessarily have to completely coincide with each other, and the optical axes may be slightly shifted so that intensity distributions substantially coincide with each other on a predetermined surface.

The color-combined light is incident on a microlens array 155 serving as a virtual secondary light source. The microlens array 155 is illuminated with the substantially collimated light flux emitted from the color combining unit 154. By using the microlens array 155, light can be collected only in a predetermined range of the miniature display unit 125. A luminance distribution of the illumination light on the miniature display unit 125 can be made uniform.

A bending mirror 156 has a function of bending an optical path from the microlens array 155 to the miniature display unit 125. That is, by inserting the bending mirror 156, a length of the dimension A of the image display unit 120 can be reduced. A condensing lens as a condensing optical member 157 forms a cell image of the microlens array 155 on the miniature display unit 125.

When liquid crystal on silicon (LCOS, registered trademark) or the like is used for the miniature display unit 125, an optical path to the image display unit 120 and the projection unit 121 is separated by a polarization splitting element 158. FIG. 10 shows an example in which a polarization beam splitter (PBS) is used as the polarization splitting element 158. The projection unit 121 is a projection optical system including a plurality of lenses, and projects image light from the miniature display unit 125 as infinity or a virtual image by changing an angle according to an angle of view. The image light from the projection unit 121 is incident on the waveguide unit 123 via the image rotation and replication unit 122, and a user can visually recognize an image in a state where see-through properties are secured.

As described above, according to the present embodiment, it is possible to improve the image quality while reducing the dimension A of the image display unit 120 in the vertical direction.

Sixth Embodiment

FIG. 11 is a configuration diagram of a virtual image generation unit according to a sixth embodiment. In FIG. 11, the components same as those in FIG. 10 are denoted by the same reference numerals, and the description thereof will be omitted. FIG. 11 is different from FIG. 10 in that a polarization filter 160, a quarter-wave plate 161, a polarization filter 162, and a diffusion plate 163 are added.

When liquid crystal on silicon (LCOS, registered trademark) or the like is used for the miniature display unit 125 and an optical path to the image display unit 120 and the projection unit 121 is separated by the polarization splitting element 158, as shown in FIG. 11, the polarization filter 162 is disposed to extract only a necessary polarization component in advance in order to illuminate with predetermined polarized light. The polarization filter 162 also has an advantage in terms of measures against stray light and contrast.

The polarization filter 160 and the quarter-wave plate 161 prevent stray light due to return light from the projection unit 121 and the waveguide unit 123.

In order to increase the efficiency and luminance of an optical system, it is effective to use a microlens array in an image display unit. In this regard, the present inventors have found that when a microlens array is used for the image display unit, a conjugate image of the microlens array is also formed in an exit pupil of a projection lens. That is, when an image is visually recognized by the optical system, a conjugate image of the light source unit 150 replicated by the microlens array 155 is formed on an emission surface of the microlens array 155. The emission surface of the microlens array 155 and the exit pupil of the projection unit 121 have a substantially conjugate positional relation. Therefore, at an exit pupil position of the projection unit 121, a conjugate image of a lens cell emission surface of the microlens array 155 and a further conjugate image of the conjugate image of the light source unit 150 formed on the emission surface of the microlens array 155 are formed. Therefore, when a user views an image through the waveguide unit 123, a conjugate image of a microlens cell and a conjugate image of a light source appear to be superimposed in front of the image, which causes a problem that image visibility is deteriorated.

The image rotation and replication unit 122 and the waveguide unit 123 have a function of replicating the exit pupil of the projection unit 121 in order to expand the eye box, and the conjugate images may be repeatedly superimposed and become inconspicuous if the number of replications is large. In contrast, when the waveguide unit 123 of a beam splitter mirror array type is used, the number of replications is reduced in principle as compared with other methods, and image visibility is greatly deteriorated by the conjugate image.

Therefore, in the present embodiment, the diffusion plate 163 is added between the microlens array 155 and the miniature display unit 125 to prevent the conjugate images of a periodic microlens array (lens cell) and a light source replicated by the waveguide unit 123. Accordingly, it is possible to blur only the conjugate images of the microlens cell and the light source to make the conjugate images inconspicuous without affecting the resolution of an image (virtual image) which is an enlarged image of the miniature display unit 125.

Here, the diffusion plate 163 is disposed at a position close to the condensing lens 157 away from the microlens array 155. In the present example, the diffusion plate 163 is disposed right behind the condensing lens 157 (upper side in FIG. 11), but it may be disposed on the front side of the condensing lens 157 (lower side in FIG. 11). By disposing the diffusion plate 163 at a position close to the condensing lens 157, it is possible to reduce a diffusion angle of the diffusion plate 163, and it is possible to blur only the conjugate images of the microlens cell and the light source while preventing the decrease in efficiency due to the insertion of the diffusion plate 163.

In consideration of the influence of the diffusion plate 163 on polarization, the polarization filter 162 is disposed right behind the diffusion plate 163. At this time, for example, the diffusion plate 163 and the polarization filter 162 are attached to the polarization splitting element 158 and are integrated with each other.

Meanwhile, it is also possible to integrate the diffusion plate 163 and the condensing lens 157. At this time, instead of the diffusion plate 163, a surface of the condensing lens 157 may be a sand-blasting surface to which a diffusion function is added.

As described above, according to the present embodiment, by using the diffusion plate that eliminates the conjugate image seen through the waveguide unit, an illumination optical system of the image display unit can be used as a Kohler illumination system using a microlens array, and high efficiency and high luminance can be implemented.

Seventh Embodiment

FIG. 12 is a configuration diagram of a virtual image generation unit according to a seventh embodiment. In FIG. 12, the components same as those in FIG. 11 are denoted by the same reference numerals, and the description thereof is omitted. FIG. 12 is different from FIG. 11 in that a wire grid film 159 is disposed as the polarization splitting element 158. A configuration is shown in which the wire grid film 159 is attached to an optically transparent substrate 164 so as not to be distorted. With this configuration, costs can be reduced by using the wire grid film as the polarization splitting element.

Since the diffusion plate 163 of the image display unit 120 diffuses image light, the diffusion plate 163 has an effect of reducing the F value of an optical system in addition to eliminating a conjugate image. Therefore, by adopting a configuration in which the F value of the projection unit 121 is also reduced, the exit pupil is expanded and the eye box is expanded. In this case, as shown in FIG. 13, the emission reflective surface 131 of the image rotation and replication unit 122 may be configured to be one surface. Accordingly, the number of emission reflective surfaces can be reduced, and manufacturing costs of the image rotation and replication unit can be reduced.

Eighth Embodiment

FIG. 14 is a diagram showing an outline of a telecentric optical system according to an eighth embodiment. Here, as the configuration of the image display unit 120, a condensing optical member is disposed between the microlens array 155 and the miniature display unit 125. Here, the single condensing lens 157 is used as the condensing optical member. The bending mirror 156 is disposed between the condensing lens 157 and the microlens array 155.

In addition, when the miniature display unit 125 is a reflective liquid crystal display, it is necessary to dispose the polarization splitting element 158 such as a polarization beam splitter or a wire grid film between the condensing lens 157 and the miniature display unit 125. Here, as the polarization splitting element 158, a configuration is shown in which the wire grid film 159 is attached to the optically transparent substrate 164.

In order to form a telecentric optical system, it is necessary to set a distance between the microlens array 155 and the condensing lens 157 and a distance between the condensing lens 157 and the miniature display unit 125 to a focal length f of the lens. Therefore, in a general telecentric optical system, reflection surfaces of the polarization splitting element 158 and the bending mirror 156 need to have substantially the same area due to geometric symmetry.

Ninth Embodiment

FIG. 15 is a configuration diagram of a virtual image generation unit according to a ninth embodiment. In FIG. 15, the components same as those in FIG. 11 are denoted by the same reference numerals, and the description thereof will be omitted. FIG. 15 is different from FIG. 11 in that a reflection surface area of the bending mirror 156 is less than a reflection surface area of the polarization splitting element 158.

That is, it may be difficult for the waveguide unit 123 to capture all the image light of the exit pupil of the projection unit 121 inside, and in many cases, the waveguide unit 123 captures a part of the image light of the exit pupil. In view of these, the efficiency does not decrease even if an effective area of the bending mirror 156 is less than an effective area of the reflection surface of the polarization splitting element 158.

Therefore, according to the present embodiment, there is an effect that the size can be reduced by making the area of the reflection surface of the bending mirror 156 less than the area of the reflection surface of the polarization splitting element 158.

Tenth Embodiment

FIG. 16 is a configuration diagram of a virtual image generation unit according to a tenth embodiment. In FIG. 16, the components same as those in FIG. 11 are denoted by the same reference numerals, and the description thereof is omitted. FIG. 16 is different from FIG. 11 in that a display 125D of a digital micromirror device type is used as the miniature display unit 125. The display 125D of a digital micromirror device type does not require separation of polarized light and can improve light utilization efficiency.

In FIG. 16, illumination light from a light source unit is incident on a condensing lens 157a divided into two pieces, reflected by the bending mirror 156, and incident on a condensing lens 157b. A light flux that passes through the condensing lenses 157a and 157b passes through an inclined surface of a total reflection prism 165, and is applied to the display 125D of a digital micromirror device type. The light flux reflected by a micromirror surface of the display 125D of a digital micromirror device type is incident on the total reflection prism 165 again at a different angle, and is totally reflected by the inclined surface. The totally reflected image light is incident on the waveguide unit 123 through the projection unit 121 and the image rotation and replication unit 122, and displays an image within a visual field of a user. Since it is necessary to obliquely apply illumination light to the display 125D of a digital micromirror device type and a reflection angle of the bending mirror 156 can be reduced, the dimension A of the image display unit 120 in the vertical direction can be reduced.

When the display 125D of a digital micromirror device type is used as the miniature display unit 125, an optical axis of light of a part to be displayed in black (hereinafter, referred to as OFF light) in an image is inclined by the digital micromirror device, and the light travels toward the projection unit. When the projection unit captures the OFF light, a display screen does not become a proper black color, which causes a decrease in screen contrast and generation of stray light. Therefore, by providing a light shielding unit 170 that shields the OFF light between the projection unit and the image rotation and replication unit or on the incident surface of the image rotation and replication unit so that the OFF light does not enter the image rotation and replication unit, the decrease in contrast and the generation of stray light can be prevented.

Eleventh Embodiment

FIG. 17 is a configuration diagram of a virtual image generation unit according to an eleventh embodiment. In FIG. 17, the components same as those in FIG. 10 are denoted by the same reference numerals, and the description thereof is omitted. FIG. 17 is different from FIG. 10 in that a self-luminous display 125O is used as the miniature display unit 125. Accordingly, an illumination optical system is no longer needed and the size is greatly reduced. As the self-luminous display, an organic EL display or a micro LED display may be used.

Twelfth Embodiment

In a twelfth embodiment, an application example of the HMD described in each embodiment will be described. FIG. 18 is a diagram showing an example of use of an HMD according to the present embodiment.

In FIG. 18, within a visual field of the user 2, content is displayed in an image (virtual image) display area 111 from the HMD 1. For example, a work procedure manual 201 or a drawing 202 for inspection, assembly, and the like of industrial equipment are displayed. Since the image display area 111 is limited, when the work procedure manual 201 and the drawing 202 are displayed at the same time, the content becomes small and the visibility becomes poor. Thus, the visibility can be improved by performing head tracking in which head orientation of the user 2 is detected by an acceleration sensor and by changing a display content according to the head orientation. That is, in FIG. 18, the work procedure manual 201 is displayed in the image display area 111 in a state where the user 2 faces the left, but when the user faces the right, the drawing 202 is displayed in the image display area 111. The work procedure manual 201 and the drawing 202 can be displayed as if there is a virtual image display area 112 in which the work procedure manual 201 and the drawing 202 can be visually recognized in a wide visual field.

Accordingly, since the visibility is improved, and the user 2 can execute the work while visually recognizing a work target (device, tool, or the like) and a work instruction at the same time, the work can be performed more reliably and errors can be reduced.

FIG. 19 is a block diagram of the HMD according to the present embodiment. In FIG. 19, the components same as those in FIG. 1 are denoted by the same reference numerals, and the description thereof is omitted. FIG. 19 is different from FIG. 1 in that a head tracking function is added in particular. That is, an image signal processing unit 103A of the HMD 1 is provided with a head tracking unit 103H. The head tracking unit 103H detects the head orientation of the user 2 based on information of an acceleration sensor 106H of a sensing unit 106A, and changes a display content according to the head orientation.

The HMD is used indoors or outdoors. Therefore, it is necessary to adjust the luminance of a display image according to the brightness of the surrounding environment. For example, an illuminance sensor 106M may be mounted on the sensing unit 106A, and the luminance of an image displayed by the image signal processing unit 103A may be adjusted according to the output of the illuminance sensor.

The embodiments according to the invention have been described above, but the invention is not limited to the above-described embodiments, and includes various modifications. For example, functional configurations of the HMD and the virtual image generation unit described above are classified according to main processing contents to facilitate understanding. The invention is not limited by the method or name of classification of the constituent elements. The configurations of the HMD and the virtual image generation unit can be further classified into more constituent elements according to the processing contents. It is also possible to perform classification such that one constituent element executes more processes.

The invention can be applied not only to an HMD but also to other image (virtual image) display devices having the configuration of the virtual image generation unit described in each embodiment.

A part of the configuration of one embodiment can be replaced with the configuration of another embodiment. The configuration of another embodiment can also be added to the configuration of one embodiment. A part of the configurations of the embodiments can be added to, deleted from, or replaced with another configuration.

REFERENCE SIGN LIST 1 head-mounted display (HMD)
101 virtual image generation unit
102 control unit
103 image signal processing unit
104 power supply unit
105 storage unit
106 sensing unit
107 communication unit
108 audio processing unit
109 imaging unit
91 to 93 input-output unit
111 image display area
112 virtual image display area
120 image display unit
121 projection unit
122 image rotation and replication unit
123 waveguide unit
125 miniature display unit
130 incidence reflective surface
131 to 134 emission reflective surface
135 emission surface
136 incidence surface
140 volume hologram 141, 142 surface digging-type diffraction grating
150, 151 light source unit
154 color combining unit
155 microlens array
156 bending mirror
157 condensing lens (condensing optical member)
158 polarization splitting element
159 wire grid film
160, 162 polarization filter
161 quarter-wave plate
163 diffusion plate
169 illumination optical system
170 light shielding unit

The invention claimed is:

1. A head-mounted display configured to display an image within a visual field of a user, the head-mounted display comprising:
an image display unit configured to generate an image to be displayed;
a projection unit configured to project image light from the image display unit;
an image rotation and replication unit configured to receive image light projected from the projection unit; and
a waveguide unit configured to transmit image light from the image rotation and replication unit to a pupil of the user, wherein
the image rotation and replication unit includes an incidence surface, an emission surface, and at least two reflection surfaces, and an angle formed by the incidence surface and the emission surface is greater than 90°, and
a normal line of a first reflection surface and a normal line of a second reflection surface of the two or more reflection surfaces of the image rotation and replication unit have a predetermined twist angle.

2. The head-mounted display according to claim 1, further comprising:
a power supply unit configured to supply power;
a storage unit configured to store information;
a sensing unit configured to detect a position and a posture of a user;
a communication unit configured to communicate with an external device;
an audio processing unit configured to input or output an audio signal; and
a control unit configured to control the entire device.

3. The head-mounted display according to claim 1, further comprising:
an acceleration sensor configured to detect movement of a head of a user;
a head tracking unit configured to change a display content according to the movement of the head of the user;
a power supply unit configured to supply power;
a storage unit configured to store information;
a communication unit configured to communicate with an external device;
an audio processing unit configured to input or output an audio signal; and
a control unit configured to control the entire device.

4. A head-mounted display configured to display an image within a visual field of a user, the head-mounted display comprising:
an image display unit configured to generate an image to be displayed;
a projection unit configured to project image light from the image display unit;
an image rotation and replication unit configured to receive image light projected from the projection unit; and
a waveguide unit configured to transmit image light from the image rotation and replication unit to a pupil of the user, wherein
the image rotation and replication unit includes an incidence surface, an emission surface, and at least two reflection surfaces, and an angle formed by the incidence surface and the emission surface is greater than 90°,
the two or more reflection surfaces of the image rotation and replication unit include an incidence reflective surface that reflects image light from the projection unit to an inner side and an emission reflective surface group including at least two emission reflective surfaces that reflect a part of the image light toward the waveguide unit,
the emission reflective surfaces are substantially parallel to each other, and
a normal line of the incidence reflective surface and a normal line of the emission reflective surface group have a predetermined twist angle.

5. The head-mounted display according to claim 4, wherein
the image rotation and replication unit is a prism provided with an incidence surface on which image light is incident, the emission reflective surface group, and an emission surface from which the image light is emitted,
the projection unit includes a projection lens, and
a surface spacing of the emission reflective surface group is less than an outer diameter of the projection lens.

6. The head-mounted display according to claim 4, wherein
an emission direction of image light from the projection unit and an incidence direction of image light to the waveguide unit are different from each other, and image light emitted from the image rotation and replication unit is incident on the waveguide unit from a side opposite to a side where a pupil of a user is located with respect to the waveguide unit.

7. The head-mounted display according to claim 4, wherein
the twist angle between the normal line of the incidence reflective surface and the normal line of the emission reflective surface group is 90°.

8. The head-mounted display according to claim 4, wherein
when an angle formed by an incidence surface and an emission surface of the image rotation and replication unit is $\theta 1$ and an angle formed by the emission reflective surface group and a normal line of the emission surface is $\theta 2$, the angles $\theta 1$ and $\theta 2$ satisfy a relation of $\theta 2 \times 2 = \theta 1$.

9. The head-mounted display according to claim 4, wherein
the waveguide unit is formed in a flat plate shape having two main parallel planes and has at least two emission reflective surfaces therein, and the two or more emission reflective surfaces are parallel to each other.

10. The head-mounted display according to claim 4, wherein
the image display unit includes
a light source unit configured to emit light, a microlens array illuminated by the light from the light source unit and configured to serve as a virtual secondary light source, a miniature display unit configured to generate an image, a condensing optical member configured to condense light from the microlens array on the miniature display unit, and a diffusion plate configured to diffuse the light from the microlens array, and the diffusion plate is disposed between the condensing optical member and the miniature display unit.

11. The head-mounted display according to claim 10, wherein the image display unit includes a bending mirror configured to bend an optical path, and a polarization splitting element configured to guide image light reflected by the miniature display unit to the projection unit, and a reflection surface area of the bending mirror is less than a reflection surface area of the polarization splitting element.

12. The head-mounted display according to claim 4, further comprising:

a quarter-wave plate and a polarization filter configured to transmit predetermined polarized light, between the image display unit and the projection unit.

13. The head-mounted display according to claim 4, wherein the waveguide unit is a waveguide unit including a surface digging-type diffraction grating or a volume hologram.

14. The head-mounted display according to claim 4, wherein a miniature display of a digital micromirror device type is mounted on the image display unit, and a light shielding unit configured to prevent light in a predetermined area from entering the waveguide unit is provided between the projection unit and the image rotation and replication unit or on an incidence surface of the image rotation and replication unit.

* * * * *